March 29, 1927. 1,622,456
A. G. LIEBMANN
FLUID PRESSURE OPERATED SHOVELING MACHINE
Original Filed Oct. 17, 1921 7 Sheets-Sheet 3

March 29, 1927.

A. G. LIEBMANN 1,622,456

FLUID PRESSURE OPERATED SHOVELING MACHINE

Original Filed Oct. 17, 1921   7 Sheets-Sheet 4

Fig. 4.

Inventor
A. G. Liebmann.
By Lacey & Lacey.
Attorneys

Patented Mar. 29, 1927.

1,622,456

UNITED STATES PATENT OFFICE.

AUGUST G. LIEBMANN, OF SAN FRANCISCO, CALIFORNIA.

FLUID-PRESSURE-OPERATED SHOVELING MACHINE.

Application filed October 17, 1921, Serial No. 503,154. Renewed August 20, 1926.

This invention relates to fluid pressure operated shoveling machines.

Various mechanisms have been devised for excavating and digging and for handling loose material such for example as coal, coke, ore, rock, earth, sand, gravel, grain, etc., but so far as I am aware they have without exception been of ponderous construction and therefore greatly restricted in their use. In fact it is the rule, rather than the exception, that where such work is to be performed it must be done in a more or less restricted space and under conditions where it is wholly impracticable to employ a mechanism of any considerable size. Therefore when these conditions are met with it becomes necessary to resort almost wholly to manual labor with a consequent increase in the cost of operations involved. It is therefore one of the primary objects of the present invention to provide a shoveling machine capable of ready and convenient manual control by a single operator and enabling him to perform the work of several men in a given period of time. In this respect the invention also contemplates the provision of a shoveling machine which may be employed where space is restricted and where it would be impracticable to employ the ponderous and cumbersome machines previously designed for this purpose.

Logically, a machine to best accomplish the purpose in view must be capable of operation to handle the material in substantially the same manner as it would be handled by direct manual labor. Therefore it is another important object of the present invention to so construct the machine that in its operation it will take up a load of the material being acted upon, elevate it, and cast it to one side in substantially the same manner as a shovel full of material would be taken up and cast aside by manual labor.

Another object of the invention is to so construct the machine that its operation may be effectually controlled so as to handle the material in the manner found most desirable, the machine being capable of operation to dig directly into the material to loosen or disintegrate the same where this task is to be performed and being also capable of operation to take up material which is already in a loose condition and cast it to one side.

A further object of the invention is to so construct the machine that it may be put to practically universal use, that is to say in excavating, digging, or working into the surface of a pile of loose material, loading and unloading cars and the like, spading soil, and in fact performing any task which might be expected of a laborer provided with a shovel and pick.

Another very important object of the invention is to provide a shoveling machine simple and compact in construction, light in weight, and embodying means enabling the operator to vary the speed with which the material to be handled is acted upon by the shovel in the various stages of transferring such material and under various conditions encountered, the machine being thus adapted for practically universal use wherever material in bulk is to be handled by a shoveling operation.

Another equally important object of the invention is to provide in a machine of the character above described, a shovel, a supporting and actuating means for the shovel, and means operable to slue the machine in a manner to cast the accumulated load from the shovel in any manner found most expedient, that is to say in a deliberate manner or in a rapid and more forcible manner thus enabling the operator to suitably direct, spread, or distribute the material as discharged from the shovel in a manner best suited to the conditions under which the machine is employed.

Another important object of the invention is to so construct the machine that in the digging operation a considerable portion of the weight of the machine may be imposed upon the shovel and its supporting means so as to assist the shovel in entering the material to be handled, the construction of the machine however being such that because of the fact that its center of gravity is located relatively low, it may be readily restored to upright position at the time the accumulated load is elevated from the mass preparatory to discharge from the shovel. In this connection the invention contemplates a machine so constructed that it may be caused to operate in a highly efficient manner in acting upon material in a manner simulating manual spading.

A further object of the invention is to provide in such a machine as that above referred to, an extensible spud which, among other functions, serves as a support for the machine, and which upon extension or projection will serve to effect elevation of the accumulated shovel load of material from the mass after the shovel has been forced into the material in a manner simulating spading and therefore in a more or less vertical direction.

The invention has as a further object to so construct the machine that, as previously stated, its center of gravity will be located relatively low so that little effort on the part of the operator will be required to maintain the stability of the machine and he may therefore control the operation thereof and resist any tendency of the machine to topple over with but little labor.

Generally speaking the shoveling machine embodying the invention comprises a spud which constitutes a supporting means and also performs other functions to be presently described, a shovel, means for supporting and actuating the shovel to dig into and accumulate a load of the material to be handled, and means for actuating the shovel to elevate and cast the accumulated load.

Figure 1:
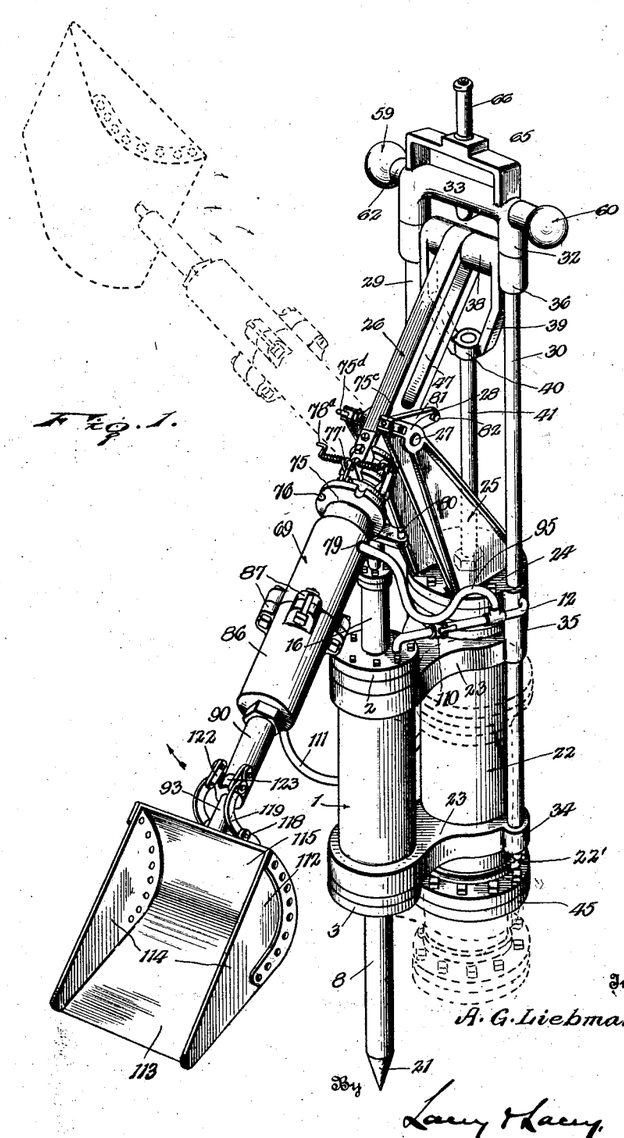
Figure 1 is a perspective view of the shoveling machine embodying the present invention, the machine being illustrated in action in digging in full lines and in discharging action in dotted lines.
Figure 5:
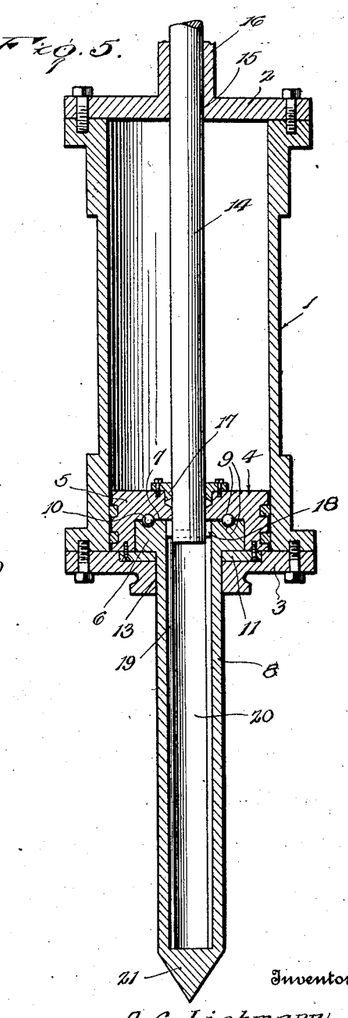
Figure 5 is a detail vertical sectional view taken substantially on the line 5—5 of Figure 2.

The spud is associated with a piston which operates in a spud cylinder which is indicated in general by the numeral 1 and which is most clearly shown in Figure 5 of the drawings, it being observed by reference to Figure 1 of the drawings that this cylinder serves either directly or indirectly as a support for practically the entire remainder of the structure. This cylinder is closed at its upper and lower ends by heads 2 and 3 respectively, and a piston, indicated in general by the numeral 4, operates within the cylinder. The head of the piston 4 comprises sections 5 and 6, the section 5 being provided in its under side with a recess indicated by the numeral 7, and the section 6 being formed at the upper end of the spud which is indicated by the numeral 8. The section 6 fits rotatably within the recess 7 in the section 5, and the two sections are provided with ball races 9 housing bearing balls 10 which serve to reduce the friction between the parts and permit rotation of the section 5 of the head (together with the cylinder 1) with relation to the section 6. The sections 5 and 6 are held assembled by a ring plate 11 which is secured in any suitable manner at its outer peripheral portion to the under side of the section 5 and engages at its inner peripheral portion beneath the section 6 and surounds the spud 8 substantially at its juncture with the said section 6. Air is admitted under pressure to the spud cylinder 1 through a pipe 12 which opens into the upper end of the cylinder and when air under pressure is admitted the piston 4 will be forced downwardly in the cylinder thus projecting the spud 8 below the cylinder and through a suitable gland 13 formed in the head 3.

The numeral 14 indicates a rifle bar which is mounted in an opening 15 and sleeve extension 16 formed respectively in and upon the head 2 of the spud cylinder 1 and this rifle bar is fitted at its lower end through a gland 17 provided upon the section 5 of the piston head 4. Within the lower end of the bar 14 there is fitted a transverse key 18 the projecting ends of which engage slidably in grooves 19 formed in diametrically opposite sides of the wall of a bore 20 which extends axially of the spud 8. The spud is provided at its lower end with a conical point 21 whereby it will be adapted to maintain its position when disposed in engagement with the ground or other surface upon which the machine is to be operated. It will now be evident that the rifle bar 14 is locked with the spud 8 by reason of the provision of the key 18 and the engagement of its ends in the grooves 19. It will also be evident that the rifle bar will be telescopically received within the bore of the spud as the cylinder 1 is raised and lowered through the admission and exhaust of air. The purpose of the rifle bar and the functioning of this bar and the spud will presently be more fully explained.

The means provided for actuating the hoist lever which supports the shovel and the actuating means therefor includes a hoist cylinder which is indicated in general by the numeral 22 and which is supported in rear of the spud cylinder 1 and upon the same by means of integrally cast brackets 23. The upper end of the cylinder 22 is closed by a head 24 upon which are supported spaced gambrels 25 the lower longer arms of which project upwardly and forwardly at an angle of inclination from the head 24 and to a point above the spud cylinder 1. The hoist lever heretofore referred to is indicated in general by the numeral 26 and the said lever is provided at a point between its ends with laterally projecting trunnions 27 which are seated in suitable bearings 28 formed in the gambrels 25 at the juncture of the longer and shorter arms of the gambrels, the lever being in this manner supported between the gambrels and above the spud cylinder 1 for rocking movement in a vertical plane.

Tubular guides 29 and 30 are mounted at the opposite sides of the hoist cylinder 22 and extend a suitable distance above the upper end of this cylinder and these guides serve also as supply pipes for the compressed air as will presently be more specifically pointed out, the upper ends of the pipes being fitted as at 31 in the downwardly extending branches 32 of a valve chest 33, these branches being located substantially at the ends of the chest and the chest extending above and between the tubular guides 29 and 30 and serving not only its primary function but also as a means for spacing and relatively bracing the said upper ends of the guides. In mounting the tubular guides 29 and 30, their lower ends are preferably stepped into sockets 34 cast upon the outer side of the hoist cylinder 22 and serving to close their said lower ends, the portions of the guides immediately above their lower ends being received in sleeve like bearings 35 also cast upon the outer side of the hoist cylinder. Collars 36 are slidably fitted onto the guides 29 and 30 and receive the ends of a cross pin 37 to which are connected the upper ends 38 of the arms 39 of a yoke 40, this yoke being fixed at the upper end of the rod 41 of the hoist piston which is indicated by the numeral 42 and which works within the cylinder 22, the rod of the piston working through the head 24 of the cylinder. In order that air may be admitted under pressure into the upper end of the cylinder 22 for the purpose of moving the piston 42 in a downward direction, the guide 29 is formed with a port 43 which registers with a port 44 formed in the wall of the cylinder 22. The lower end of the cylinder 22 is closed by a head 45. The hoist lever 26 is formed rearwardly of its supporting trunnions with a longitudinally extending slot 47 which receives the intermediate portion of the cross pin 37 and it will now be evident that while the said hoist lever normally assumes the downwardly and forwardly inclined position shown in Figures 1 and 2 of the drawings, the admission of air into the upper end of the cylinder 22 and the consequent downward movement of the piston 42 will result in a downward pull being exerted on the rear end of this lever for the purpose of elevating its forward end and with it the shovel and its associated parts. The rate at which air is admitted into the upper end of the cylinder 22 will of course determine the speed of downward movement of the piston 42 and consequently the speed with which the hoist lever or jib 26 is swung upwardly in casting the accumulated load, and valved means is provided for controlling the admission of air to this cylinder as will presently be described. In order that the downward movement of the piston 42 may be cushioned to the desired degree, a by-pass 22′ is provided and has one branch communicating with the cylinder 22 a distance above the head 45 somewhat greater than the thickness of the piston head 42, and its other branch communicating with the said cylinder close to the bottom or head 45. Therefore when the piston 42 passes the first mentioned branch of the by-pass, air will pass through the by-pass and around to the lower end of the cylinder and beneath the piston 42 for the purpose stated.

Air is admitted into the valve chest 33 from any suitable source of compressed air supply as for example by way of a supply pipe or hose 48. This chest is provided inwardly of its branches 32 with valve seats 49 and 50 with which cooperate valves 51 and 52 respectively held to their seats by an interposed compression spring 53 which bears at its ends against the valves. The valves 51 and 52 respectively control the admission of air under pressure to the tubular guides 29 and 30. Each valve has a stem indicated by the numeral 54 and provided with projecting studs 55 which work in slots 56 formed in extensions 57 which lead from the ends of the valve chest 33, the valve stems being in this manner supported for longitudinal movement but held against rotation. The movement of the valves to open and closed position is effected through the rotation of valve handles 59 and 60 each of which comprises a substantially spherical head 61 having a sleeve extension 62 which rotatably fits the extension 57 at the respective end of the valve chest 33 and is held against longitudinal displacement by a screw 58 threaded through the extension 62 and engaging in a groove 58' in the extension 57. The head 61 of each valve handle is provided with a threaded bore 63 into which is fitted the threaded outer end 64 of the respective valve stem 54. It will now be evident that the valve handles 59 and 60 serves as a means whereby the upper portion of the machine may be grasped and supported by the operator and the machine thus held in an upright position while in operation, either valve handle being capable of manipulation to effect opening or closing of the respective valve 51 or 52 as the case might be and thus control the admission of air under pressure to the tubular guides 29 and 30. For reasons which will presently be made clear, it is necessary that trapped air be permitted to exhaust from the guides 29 and 30 upon closing of the respective valves 51 and 52 and for this purpose the extensions 57 of the valve chest 33, and the extensions 62 of the valve handles 59 and 60 respectively are formed with exhaust ports indicated respectively by the numerals 59' and 60', these ports being designed to be brought into registration when the valves 51 and 52 respectively are closed and being adapted to be brought out of registration when the valve handles 59 and 60 are rotated to move the valves 51 and 52 to open position.

In the load casting or discharging operation of the machine the entire structure swings laterally in one direction or the other being rotatable about the axis of the spud and in order that the machine may be steadied and controlled in this swinging movement, a yoke 65 is cast upon the top of the valve chest 33, and a rotatable handle 66 is mounted in upright position upon the intermediate portion of this yoke and may be grasped for the purpose stated.

Figures 2, 8:
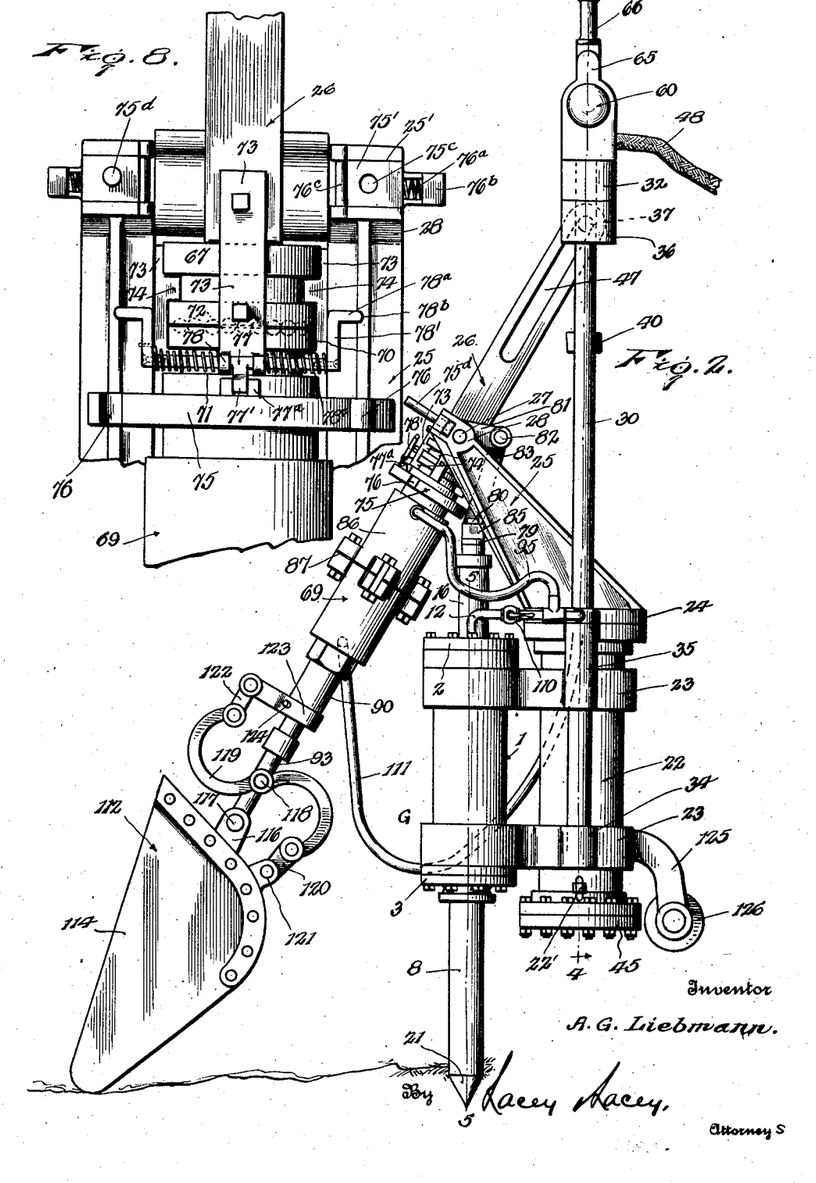
Figure 2 is a side elevation of the machine.
Figure 8 is a detail plan view of a portion of the machine illustrating the means provided for maintaining the shovel and its supporting means in normal position during the digging operation for laterally sluing the assemblage at the time of discharging the accumulated load from the shovel.
Figures 3, 11, 12, 13:
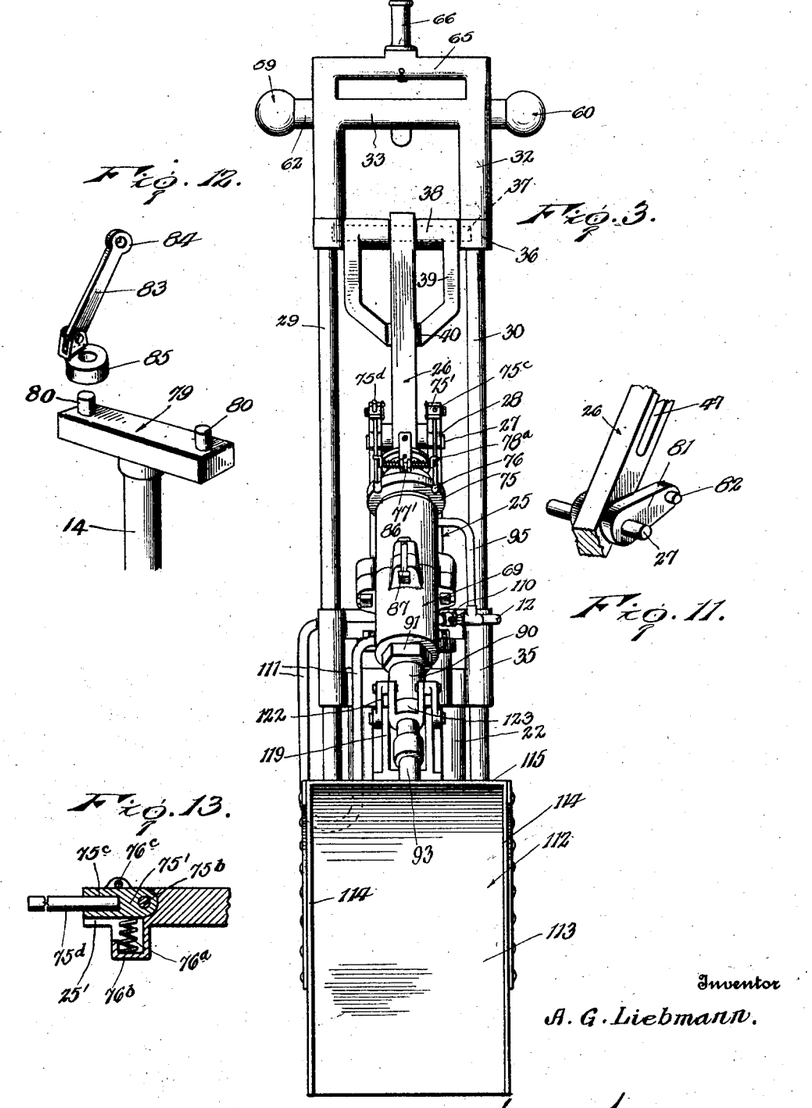
Figure 3 is a front elevation thereof.
Figure 11 is a fragmentary perspective view illustrating a portion of the mechanism.
Figure 12 is a perspective view illustrating the means provided for effecting lateral turning or swinging movement of the shovel and its support.
Figure 13 is a detail sectional view taken substantially on the line 13—13 of Figure 9 looking in the direction indicated by the arrows.

At its forward end the hoist lever 26 is formed with a head 67 having a circumferential groove 68. The mechanism for actuating the shovel comprises an impulse motor which is indicated in general by the numeral 69 and the valve casing of this motor is provided with an integral head 70 which is formed with a circumferential groove 71. The heads 67 and 70 are disposed in abutting relation and bearing balls 72 are interposed between their confronting faces. Connecting clips 73 are secured to the head 67 and have spaced portions 74 engaging in the grooves 68 and 71. In this manner the head 70 is connected with the head 67 for swiveling movement with relation thereto and consequently the impulse motor and all parts associated therewith may be rotated laterally in either direction about an axis in alignment with the axis of the hoist lever 26 so as to provide for the discharge of the accumulated load of material from the shovel in a manner which will presently be more particularly point out. This turning movement of the parts is effected in a manner and by a means which will now be described. The head 70 is provided forwardly of the groove 71 with a collar 75 having peripherally spaced notches 76 spaced at about 90° and located at the opposite sides of the center as best shown in Figure 8. The short arm of each gambrel is bifurcated as indicated by the numeral 25', and pivotally supported within the bifurcation is a socket member 75', the pivot pin for the said member being indicated by the numeral 75$^b$ and the member being provided in its outer or free end with a socket 75$^c$. An abutment pin 75$^d$ is adapted to be fitted into the sockets 75$^c$ interchangeably so as to be located at either side of the center of the machine and in the path of movement of one or the other of the notches 76 when the hoist lever 26 is swung upwardly carrying with it the collar 75. The socket members 75' are normally held in active position or in other words in position to support the pin 75$^d$ in the path of movement of one or the other of the notches 76, by means of springs 76$^a$ seated in pockets 76$^b$ formed upon the short gambrel arms opposite the bifurcation in the respective arm, the said springs bearing within the pockets and against the respective socket members 75'. The movement of the socket members 75' under the influence of the springs 76$^a$ is limited by engagement of the said members against pins 76$^c$ which extend across the inner or relatively adjacent sides of the bifurcations in the gambrel arms as best shown in Figure 13. It will now be evident that when the pin 75$^d$ has been seated in one or the other of the sockets 75$^c$, it will project beyond the extremity of the respective gambrel arm and in the path of movement of the notch 76 at the respective side of the shovel assemblage. Therefore when the hoist lever 26 is rocked upon its fulcrum to elevate the shovel and its associated parts, one or the other of the notches 76 will meet the pin 75$^d$, depending upon which side of the structure the pin is disposed, and as the pin offers resistance to further movement of the collar 75 and its support, the collar will be caused to rotate carrying with it the head 70, the impulse motor, and the shovel. When the hoist lever 26 is rocked in the reverse direction as the shovel is being lowered, the engagement of the pin 75$^d$ in the notch 76 in the collar 75 will effect a return rotary movement of the parts to normal position. Inasmuch as the pin 75$^d$ may be interchangeably seated in the sockets 75ᶜ, the machine may be readily adapted to cast the accumulated load toward either side at the time of elevation of the shovel. It will further be evident that the socket members 75' are adapted for outward pivotal movement against the tension of the spring 76ᵃ so that after the pin 75ᵈ has engaged in one or the other of the notches in the collar 75 and the collar is rotated, the pin may yield in an outward direction to compensate for the outward or lateral travel of the notch, thus avoiding any binding of the parts.

Inasmuch as the shovel assemblage is connected by a swivel joint with the hoist lever 26, it is necessary that some means be provided for preventing rotation of the shovel assemblage until such time as the assemblage is properly rotated through engagement of the pin 75ᵈ in the notches 76 as otherwise an unbalanced load of the material in the shovel would cause the shovel to overturn in one direction or the other with the consequent premature discharge of the load and a failure of the notches 76 to meet the pin 75ᵈ. With this end in view a shaft 77 is mounted for rocking movement in bearings 78 upon an extension of one of the connecting clips 73, this clip being secured to the head 67 as previously stated. The shaft 77 is provided intermediate of its ends with a latch finger 77' adapted for engagement in a keeper 77ᵃ provided upon the rear face of the collar 75. The shaft 77 is provided at its ends with crank arms 78' having laterally outwardly turned ends 78ᵃ the extremities of which are rounded as at 78ᵇ. Springs 78ᶜ are arranged upon the shaft 77 and are so connected therewith as to normally hold this shaft in position with the latch finger 77' engaging in the keeper 77ᵃ. With the parts in this position the collar 75 is locked with relation to the hoist lever 26 and consequently the shovel assemblage is prevented from rotating under the influence of an unbalanced load in the shovel. However the ends 78ᵃ of the crank arms 78' are so located that the pin 75ᵈ will be in the path of movement of one or the other of these portions of the crank arms in the upward movement of the hoist lever and the shovel assemblage. As a consequence when the hoist lever is swung upon its pivot to elevate the shovel assemblage, the portion 78ᵃ of one or the other of the crank arms 78' will be brought into engagement with the pin 75ᵈ prior to engagement of this pin in the adjacent notch 76, and the shaft 77 will be rocked to elevate the latch finger 77' out of the keeper 77ᵃ thus freeing the shovel assemblage for rotation through the resistance offered by the pin 75ᵈ. Inasmuch as the sockets provided for supporting this pin may yield in an outward direction as previously stated, and the extremities 78ᵇ of the portions 78ᵃ are rounded, these extremities may ride past the pin 75ᵈ without the slight outward displacement of the pin disengaging the same however from the notch 76. Of course in the return movement of the parts the extremity of one or the other of the portions 78ᵃ will again ride past the pin 75ᵈ, and the latch finger 77' will be permitted to return into engagement in the keeper 77ᵃ to again lock the shovel assemblage at the time it is returned to its normal position.

Not only does the present invention contemplate that the shovel shall be rotated, in the manner above explained, so as to present its open side laterally in one direction or the other to provide for ready discharge of the accumulated load therefrom, but means is provided, in addition, for imparting a lateral swinging movement to the shovel assemblage so that the load may be cast from the shovel a greater or less distance to either side of the machine. In order that this result may be obtained, a crosshead 79 is fixed upon the upper end of the rifle bar 14 and is provided substantially at its ends with upstanding studs 80. Crank arms 81 are fixed upon or cast integral with the trunnions 27 at the opposite sides of the hoist lever 26 and each arm is provided at its outer end with a laterally projecting crank pin 82. The numeral 83 indicates a thrust link provided at one end with an eye 84 adapted to receive the crank pin 82 upon either crank arm 81, and at its other end is pivoted to a laterally disposed collar 85 adapted to be fitted over the stud 80 at the respective side of the crosshead 79. The thrust link 83 is adapted to be employed at either side of the machine depending upon the direction which it is desired to laterally cast the material and it will be evident that the same serves to establish a thrust connection between the hoist lever and the rifle bar.

At this point it will be evident that there is little frictional resistance offered to the rotation of the section 5 of the piston head 4 with relation to the section 6 because of the provision of the bearing balls 10 between these parts. In any event the frictional resistance offered at this point is considerably less than that offered by the frictional engagement of the point of the stud in the ground and consequently when the hoist lever 26 is swung downwardly at its rear end to elevate the shovel assemblage the thrust exerted by the link 83 against the crosshead 79 will not effect a rotation of the rifle bar 14 and spud 8 but this force will be resolved into what may be termed a "backing off" rotation of the spud cylinder and all of the parts supported either directly or indirectly thereby, about the spud as an axis, less resistance being offered to this movement of the mechanism as a unit than to rotative movement of the spud and rifle bar.

Figures 6, 7:
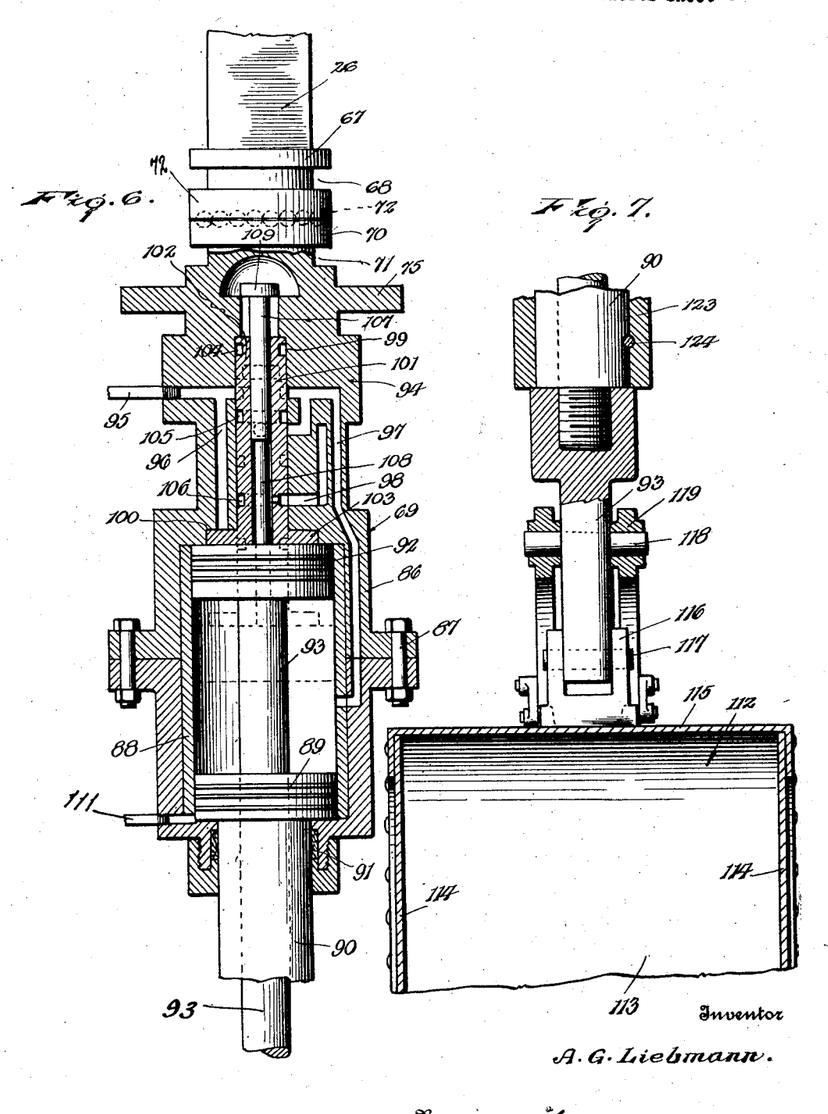
Figure 6 is a detail longitudinal sectional view through the impulse motor of the machine and the valve for controlling the admission of fluid under pressure thereto.
Figure 7 is a detail longitudinal sectional view through the upper portion of the shovel of the machine and the parts associated therewith.
Figure 9:
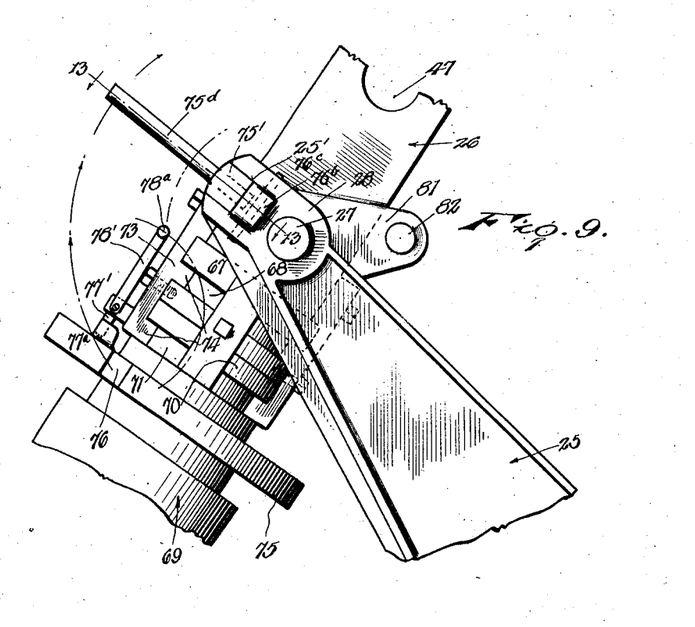
Figure 9 is a side elevation of the structure shown in Figure 8, in detail, the parts being shown in substantially the positions they will occupy during the digging operation of the shovel.
Figure 10:
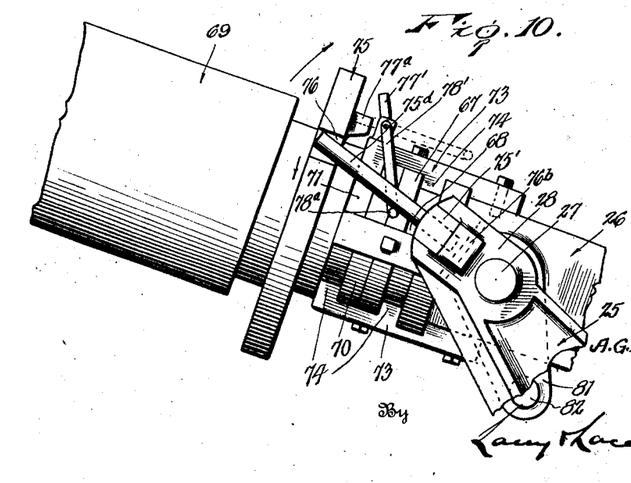
Figure 10 is a view similar to Figure 9 illustrating an intermediate position of the parts.

The mechanism for operating the shovel will now be specifically described. This mechanism, heretofore designated by the numeral 69, comprises an impulse motor the cylinder of which is indicated by the numeral 86 and, in that form of the invention shown in Figure 6 of the drawings, is formed in two sections bolted together as at 87 and housing a lining wall 88. The numeral 89 indicates a working piston which is mounted to work in the lower or forward end of the cylinder 86 and is provided with a hollow stem 90 which works through a stuffing box 91 upon the lower head of the cylinder. A second piston 92 also works in the cylinder 86 and is provided with a stem 93 which reciprocates within the bore of the stem 90. Associated with the cylinder of the impulse motor is a valve chest indicated in general by the numeral 94 and air is admitted to this chest preferably by way of a flexible hose 95 and passes to an intake port 96 provided within the chest. This port 96 is designed to discharge into the upper end of the cylinder 86, and it has a branch 97 which as illustrated in Figure 6 is designed to discharge into the lower portion of the cylinder. The numeral 98 indicates an exhaust port in the chest. The chest is provided axially with a bore 99 which opens at its lower end into a recess 100 formed in the inner side of the upper head of the cylinder 86. The valve which controls the admission of air under pressure to the cylinder is indicated in general by the numeral 101 and the same comprises a sleeve like body 102 and a head 103 which latter is located at the lower end of the body and is adapted to seat within the recess 100. The valve 101 is designed to reciprocate in the bore 99 of the valve chest and is formed at suitably spaced intervals in the length of its body with circumscribing air passages 104, 105 and 106. In addition to the stem 93, the piston 92 is provided with a tappet stem 107 having its lower portion reduced in diameter as indicated by the numeral 108, and this stem is slidably received within the bore of the body 102 of the valve and is provided at its upper end with a tappet head 109 for coaction with the upper end of the valve body.

By reference now to Figure 6 it will be observed that when air under pressure is admitted through pipe 95 it will enter the port or passage 96 and act against the head 103 of the valve 101 and also against the piston 92, forcing the piston and valve downwardly within the cylinder 86. After the piston 92 moves downwardly the tappet head 109 at the upper end of the stem 107 will strike against the upper end of the valve body 102 moving the valve further in a downward direction until the passage-way 104 is brought into alignment with the intake end of the port 97 at which time air will be admitted into the lower end of the cylinder beneath the piston 92 forcing the piston on its return stroke. The upward or return movement of the piston will of course result in return of the valve to its full elevated position whereupon air will again be admitted to the upper end of the cylinder to force the piston on its down stroke. Thus when air under pressure is supplied to the motor, the piston 92 will be rapidly reciprocated, the piston 89 however remaining stationary. The pipe 95 leads to and forms a juncture with the pipe 12 which pipe in turn leads from the tubular guide 30 so that when the valve handle 60 is rotated to open the valve 52, air will be supplied to the motor. A manually operable cut-off valve 110 is interposed in the pipe 12 between the point of juncture of the pipe 95 therewith and the spud cylinder 1 and by manipulating this valve the admission of air to the spud cylinder may be controlled independently of the supply of air to the motor.

Figure 4:
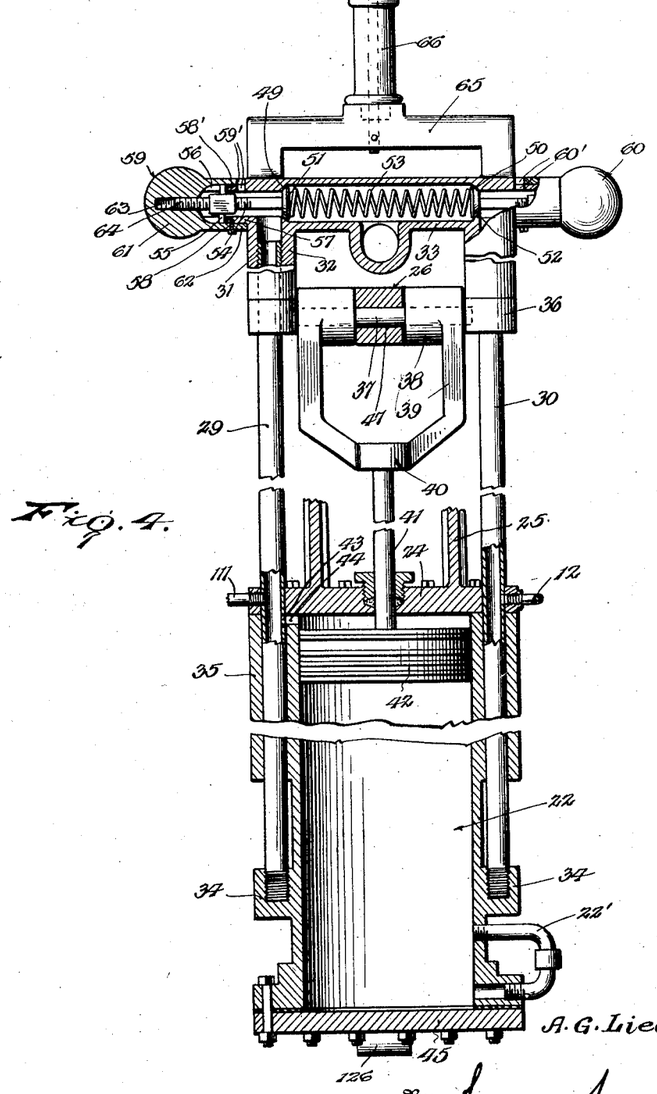
Figure 4 is a detail vertical sectional view taken substantially on the line 4—4 of Figure 2, parts being broken away.

Air is adapted to be supplied from the tubular guide 29 to the lower end of the cylinder 86 and behind the piston 89 by way of a pipe 111 which leads from the said guide 29 as shown in Figure 4 and connects with the said cylinder as shown in Figure 6.

The shovel of the machine is indicated in general by the numeral 112 and the same comprises a bottom 113, sides 114, and a back 115. Spaced ears 116 are provided upon the back 115 and pivotally receive between them a pin 117 at the lower or forward end of the piston rod 93. Trunnions 118 project from diametrically opposite sides of the rod 93 and mounted upon these trunnions are the intermediate portions of rocking arms 119, these arms being arranged at opposite sides of the rod 93 and being connected at their lower ends by links 120 with ears 121 upon the rear side of the back of the shovel. At their upper ends the arms are connected by links 122 to ears upon a collar 123 which is secured as for example by a key 124 upon the lower or forward end of the rod 90. As previously stated, in the operation of digging, the piston 89 will remain stationary but the piston 92 will reciprocate. Therefore the collar 123 will under these conditions remain stationary but the trunnions 118 which support the arms 119 will be moved back and forth through reciprocation of the piston rod 93. Therefore the arms will be rocked in such a manner as to impart a back and forth scooping movement to the shovel 112 causing it to dig into and accumulate a load of the material to be handled. After a load of the material has been accumulated and it is desired to discharge the load by casting it to one side or the other of the machine, the operation of the piston 92 is arrested and air is admitted through the pipe 111 to the lower end of the cylinder 86 thus forcing the piston 89 inwardly and moving the collar 123 in a corresponding direction. In this movement of the collar the arms 119 will be so rocked as to kick or sharply swing the shovel 112 in an upward direction thus locking it and holding it in position to support the accumulated load without any of it being accidentally dropped.

In opening the valve 51 to admit air under pressure through the pipe 11 to the lower end of the cylinder of the impulse motor for the purpose above explained, air is at the same time admitted through the ports 43 and 44 into the upper end of the hoist cylinder 22 thus forcing the piston 42 downwardly in the cylinder and rocking the hoist lever 26 upon its fulcrum to elevate the shovel and the load accumulated therein. At the same time the valve 110 is opened so as to admit air under pressure to the spud cylinder thereby effecting upward movement of the superstructure as a whole. During the digging operation the machine has been inclined forwardly so that the shovel enters the material substantially vertically, and at the time air is admitted into the spud cylinder and acts against the spud piston to project the spud, a slight backward pull upon the handle 66 will restore the machine to vertical or substantially vertical position and the shovel will take up and elevate the accumulated load, removing it from the mass of the material. As stated but slight effort is required to restore the machine to vertical position in this stage of the operation and in fact if air is rapidly admitted to the spud cylinder, the machine will have a tendency to rear backwardly upon the spud, and the skilled operator may then by slightly resisting this force, establish and maintain the machine in upright position. Of course the speed with which the shovel assemblage is elevated will depend upon the rapidity with which air is admitted into the spud and hoist cylinders, and this admission of air will be controlled accordingly as it is desired to deliberately cast the load a relatively short distance or to a relatively great distance from the machine with greater force.

As the hoist lever or jib 26 is rocked about its fulcrum to elevate the shovel assemblage, the force exerted against the thrust link 83 will, as previously explained, be resolved into a rotative movement of the entire superstructure, including the shovel assemblage, about the spud as an axis. At the same time the portion 78ª of that one of the crank arms 78' in the path of movement of which the pin 75ᵈ is located, will engage the said pin thus rocking the shaft 77 to disengage the latch finger 77' from the keeper 77ª and at this moment the pin 75ᵈ will engage in the corresponding notch 76 and upon continued upward movement of the shovel assemblage, it will be rotated so as to present the open side of the shovel laterally in the direction in which the assemblage is being swung through the force exerted against the thrust link. It will now be evident that having accumulated a load of the material in the shovel, the machine may be established and maintained in an upright position while the shovel assemblage is being swung upwardly and laterally and rotated to cast the material in a deliberate manner or in a more violent manner toward one side or the other of the machine. It will be apparent from the foregoing that the operation of the machine in accumulating the load and in casting the load to one side or the other is at all times under the control of the operator and he may so govern the operation as to cast the material to any desired point with a considerable degree of accuracy.

In order that the machine may be conveniently moved from place to place, an arm 125 is provided upon the lower one of the supporting connections 23 and a ground wheel 126 is mounted upon the lower end of this arm as shown in Figure 2, so that the machine may be trundled in the manner of a wheel barrow.

Figure 14:
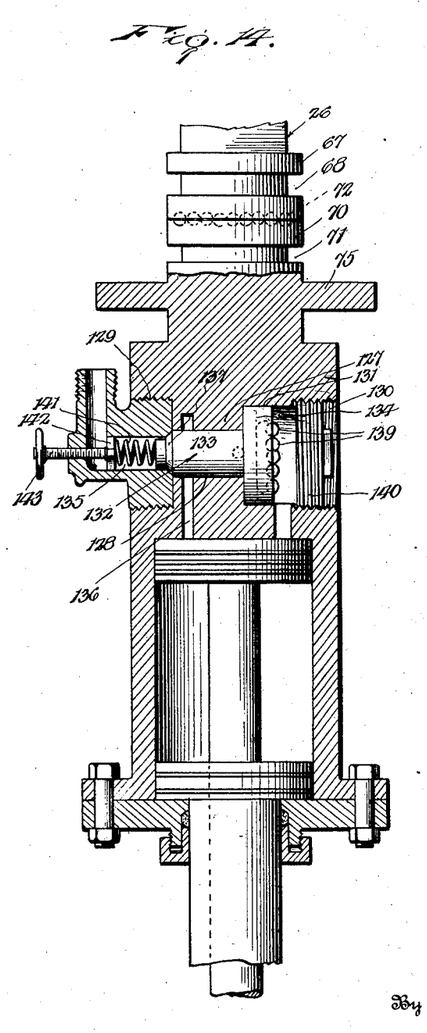
Figure 14 is a view similar to Figure 6 illustrating a modified form of the impulse motor and valve therefor.

Figure 14 of the drawings illustrates a slightly modified form of the invention and particularly as regards the valve for controlling the admission of air under pressure to the impulse motor and in this figure the valve chest is indicated by the numeral 127 and the same is provided with a transverse bore 128 and with recesses 129 and 130 at the ends of this bore, the bore being enlarged at its end which communicates with the recess 130 as indicated by the numeral 131. The valve which operates within the chest is indicated in general by the numeral 132 and the said valve comprises a body 133 provided at one end with a head 134 which is adapted to seat in the enlargement 131 of the bore in one position of the valve, the valve body 135 occupying the said bore 128 and being slidable therein. An inlet passage 135 is provided axially within the valve chest and the head of the motor within which the chest is provided, and this passage has a branch 136 closed by the valve body 135 when the valve is in the position shown in Figure 14. The valve body is provided with a reduced end 137 adapted to register with the passage 136. The valve chest is also provided with exhaust ports 139 which are uncovered by the head 134 of the valve when the valve is in the position shown in Figure 14 but is closed by the said head when the valve is in its opposite position. In this latter position the reduced end 137 will register with the passage 136 and the valve head will rest against a plug 140 threaded into the recess 130. A spring 141 is arranged within the bore 128 and bears at one end against that end of the valve body at which the head 134 is located, the other end of the spring bearing against an abutment member 142 fitted into the recess 129. The screw 143 is adapted to be adjusted so as to vary the resistance offered by the spring 141.

In the operation of the valve above described, air under pressure, admitted to the valve casing, acts against the end of the valve and moves the same toward the right in Figure 14 to position closing the exhaust ports 139 thus bringing the reduced end 137 into registration with the passage 136. The back pressure within the valve casing and motor cylinder will build up behind the head 134 of the valve moving the valve to closed position as shown in the said figure whereupon the valve will again immediately move to open position and be again immediately closed, this operation being repeated with rapidity. By adjusting the stem 143, the tension of the spring 141 may be varied so as to resist to a greater or less degree the closing movement of the valve and thus, to the desired degree, reduce the speed of reciprocation of the valve to a working degree.

It will be evident that the compressed air entering through the passage 135 and acting against the end of the valve 132, will move the valve to the right in Figure 14 momentarily closing the exhaust ports 139, the air passing through the passage 136 into the cylinder and acting against the piston. However movement of the piston is resisted by the engagement of the shovel with the work and pressure will therefore build up in the cylinder back of the head 134 of the valve thus moving the valve to its closed position as shown in Figure 14. Upon such movement of the valve air will exhaust through the openings 139, and the air pressure will again act against the smaller end of the valve body again moving the same to the right in Figure 14. In this manner rapid reciprocatory motion is imparted to the valve. It will be understood of course that when the nose of the shovel is inclined forward to the material or swung into engagement with the material, the resistance offered to the shovel will be transmitted to the piston of the motor and this resistance is increased as the shovel fills. Because of the action of the valve in the manner above described, a very powerful short stroke is imparted to the shovel with sufficient force to overcome any resistance tending to retard the jigging movement.

Having thus described the invention what is claimed as new is:

1. In a shoveling machine, a supporting means, a member supported thereon for tilting movement, means for tilting the member, a shovel, means carried by the tilting member and supporting the shovel for movement to elevated position upon tilting of the said member, the shovel supporting means being rotatable laterally to effect lateral tilting of the shovel supported thereby, and coacting means upon the first mentioned supporting means and the shovel supporting means for effecting such rotation, the last mentioned means comprising a relatively fixed abutment carried by the first mentioned supporting means, and means upon the shovel supporting means for coaction with the abutment in the tilting movement of the tilting member.

2. In a shoveling machine, a supporting means, a member supported thereon for tilting movement, means for tilting the member, a shovel, means carried by the tilting member and supporting the shovel for movement to elevated position upon tilting of the said member, the shovel supporting means being rotatable laterally to effect lateral tilting of the shovel supported thereby, and coacting means upon the first mentioned supporting means and the shovel supporting means for effecting such rotation, the last mentioned means comprising a displaceable relatively fixed abutment carried by the first mentioned supporting means, and means upon the shovel supporting means for coaction with the abutment in the tilting movement of the tilting member.

3. In a shoveling machine, a supporting means, a member supported thereon for tilting movement, means for tilting the member, a shovel, means carried by the tilting member and suporting the shovel for movement to elevated position upon tilting of the said member, the shovel supporting means being rotatable laterally to effect lateral tilting of the shovel supported thereby, and coacting means upon the first mentioned supporting means and the shovel supporting means for effecting such rotation, the last mentioned means comprising a collar associated with the shovel supporting means and having peripherally spaced notches, and an abutment element interchangeably positioned upon the supporting means for coaction with either notch.

4. In a shoveling machine, a supporting means, a member supported thereon for tilting movement, a shovel, means for supporting and operating the shovel to dig into and accumulate a load of the material to be handled comprising a motor, swivel connection between the motor and the tilting member providing for rotation of the motor and the shovel supported thereby laterally in a manner to correspondingly tilt the shovel to discharge the accumulated load, and coacting means upon a member of the motor and upon the supporting means for effecting such movement of the parts upon tilting movement of the tilting member.

5. In a shoveling machine, supporting means including a surface-engaging supporting member and a member rotatable with relation thereto, a member supported for body movement with the rotatable member and for tilting movement with relation thereto, a shovel movable with the tilting member, means for tilting the said member, and operative selectively displaceable thrust connection between the tilting member and the surface-engaging supporting member for effecting a rotative displacement of the tilting member and with it the said shovel.

6. In a shoveling machine, supporting means including a surface-engaging supporting member and a member rotatable with relation thereto, a member supported for body movement with the rotatable member and for tilting movement with relation thereto, a shovel movable with the tilting member, a crosshead operatively connected with the surface-engaging supporting member, and a thrust link establishing connection between the tilting member and the said crosshead whereby to effect rotative displacement of the tilting member upon movement thereof.

7. In a shoveling machine, supporting means including a surface-engaging supporting member and a member rotatable with relation thereto, a member supported for body movement with the rotatable member and for tilting movement with relation thereto, a shovel movable with the tilting member, means for tilting the said member, spaced pivot elements fixed with relation to the tilting member eccentric to the axis of tilting movement thereof, a crosshead fixed with relation to the surface-engaging supporting member and having pivot elements located at opposite sides of the axis of rotation of said surface-engaging supporting member, and a thrust link adapted for selective engagement with the pivot elements at either side of said axis and to thereby establish operative thrust connection between the tilting member and the surface-engaging supporting member for effecting rotative displacement of the tilting member and shovel upon movement thereof.

8. In a shoveling machine, supporting means including a fluid pressure cylinder, a piston working therein, means for admitting fluid under pressure to the cylinder to effect movement of the piston in the direction of the lower end of the cylinder, a spud operatively connected with the piston and constituting a surface-engaging supporting member, a rifle bar associated with the spud for rotary movement in unison therewith and telescopically connected therewith, a support bodily movable with the fluid pressure cylinder, a crosshead fixed with relation to the rifle bar and having pivot elements located at opposite sides of the axis of the bar, a member mounted for tilting movement upon the supporting member, a shovel movable with the tilting member, means for tilting the said member, pivot elements at opposite sides of the tilting member, and a thrust link selectively engageable with correspondingly located ones of the pivot elements whereby to establish connection between the tilting member and the crosshead to effect turning movement of the supported parts upon tilting movement of the tilting member.

9. In a shoveling machine, a fluid pressure cylinder, a piston working therein, a surface-engaging supporting spud associated with the piston and movable therewith, means for admitting fluid under pressure to the cylinder to effect movement of the piston in the direction of the lower end of the cylinder to project the spud and elevate the cylinder with relation thereto, supporting means bodily movable with the cylinder, a member mounted for tilting movement upon the supporting means, a shovel bodily movable with the tilting member, means for tilting the said member, and means for operating the shovel to dig into and accumulate a load of the material to be handled.

10. In a shoveling machine, a supporting means, a member supported thereon for tilting movement, a shovel movable with the member to be elevated thereby, a fluid pressure cylinder associated with the supporting means, a piston working in the cylinder spaced upright guide members fixed with relation to the cylinder, and operative connection between the piston and the tilting member and guided by the said upright guide members.

11. In a shoveling machine, a supporting means, a member supported thereon for tilting movement, a shovel movable with the member to be elevated thereby, a fluid pressure cylinder associated with the supporting means, a piston working in the cylinder, spaced upright guide members fixed with relation to the cylinder, and operative connection between the piston and the tilting member and guided by the said upright guide members, the said connection comprising spaced members slidable upon the guide members, and a cross pin extending between the same, the tilting member having a longitudinal slot receiving the said cross pin.

12. In a shoveling machine, a fluid pressure motor comprising a cylinder, a piston operating in the cylinder, a relatively fixed part, a shovel supported for swinging movement upon the rod of the piston, a rock member mounted for rocking movement upon the piston rod and having operative connection with the fixed part and with the shovel, and valved means for admitting fluid under pressure to the cylinder to reciprocate the piston.

13. In a shoveling machine, a fluid pressure motor comprising a cylinder, a piston working in the cylinder and having a hollow stem, a second piston working in the cylinder and having a rod working through the stem of the first mentioned piston, a shovel supported for swinging movement upon the rod of the second mentioned piston, a rocker mounted for rocking movement upon the said rod and having operative connection with the stem of the first mentioned piston and with the shovel, means for admitting fluid under pressure to the cylinder to effect reciprocation of the second mentioned piston and thus impart swinging digging movement to the said shovel, and means for admitting fluid under pressure to the cylinder to effect movement of the first mentioned piston and thereby act upon the rocker to move the shovel upwardly to load supporting position.

14. In a shoveling machine, a supporting structure, a ground engaging member associated therewith, means upon the structure whereby it may be manually steadied in an upright operating position, a shovel supported by and in advance of the structure, means upon the structure for operating the shovel to dig into and accumulate a load of the material to be handled, and means for actuating the shovel to swing it laterally and overturn it to cast the accumulated load to one side.

15. In a shoveling machine, a supporting structure, a ground engaging member associated therewith, means upon the structure whereby it may be manually steadied in an upright operating position, a shovel supported by and in advance of the structure, means for operating the shovel to dig into and accumulate a load of the material to be handled, and means for actuating the shovel to elevate the same, swing it laterally, and cast the load to one side.

16. In a shoveling machine, a supporting structure, a ground engaging member associated therewith, means upon the structure whereby it may be manually steadied in an upright operating position, a shovel supported by and in advance of the structure, means for operating the shovel to dig into and accumulate a load of the material to be handled, and means upon the structure operable coordinately to elevate the shovel, to swing it laterally, and to tilt it laterally to discharge the accumulated load.

17. In a shoveling machine, a supporting structure, a ground engaging member associated therewith, means upon the structure whereby it may be manually steadied in an upright operating position, a shovel supported by and in advance of the structure, means upon the structure for operating the shovel to dig into and accumulate a load of the material to be handled, means operable to move the shovel to position to support the accumulated load, means operable to bodily swing the shovel laterally, and means operable to tilt the shovel laterally to discharge the accumulated load.

18. In a shoveling machine, a supporting structure, a ground engaging member associated therewith, means upon the structure whereby it may be manually steadied in an upright operating position, a member supported upon the structure for tilting movement, a shovel, means supporting the shovel upon the said member for movement therewith to be elevated thereby and capable of movement with relation to the tilting member to effect lateral tilting of the shovel, coacting means upon the supporting structure and the said supporting means for the shovel for effecting such movement of the latter means, and means operable to laterally swing the tilting member.

19. In a shoveling machine, a supporting structure, a ground engaging member associated therewith, means upon the structure whereby it may be manually steadied in an upright operating position, the supporting structure being rotatable with relation to the surface engaging member, a member mounted for tilting movement upon the supporting structure, a shovel supported thereby and movable therewith, means for tilting the said member, and operative thrust connection between the tilting member and the surface engaging member for effecting rotative displacement of the tilting member.

20. In a shoveling machine, a supporting structure, a ground engaging member associated therewith, means upon the structure whereby it may be manually steadied in an upright operating position, a shovel upon the supporting structure, means for operating the same to accumulate a load of the material to be handled, and means upon the supporting structure operable to impart a lateral casting motion to the shovel.

21. In a shoveling machine, a supporting structure, a ground engaging member associated therewith, means upon the structure whereby it may be manually steadied in an upright operating position, a shovel upon the supporting structure, means for operating the same to accumulate a load of the material to be handled, and means operable to consonantly elevate and slue the said mechanism.

22. In a shoveling machine, a supporting structure, a ground engaging member associated therewith, means upon the structure whereby it may be manually steadied in an upright operating position, a shovel upon the supporting structure, means for operating the same to accumulate a load of the material to be handled, and means operable to consonantly elevate and slue the said mechanism and rotate the shovel about its longitudinal axis.

23. In a shoveling machine, a supporting structure, a ground engaging member associated therewith, means upon the structure whereby it may be manually steadied in an upright operating position, a shovel upon the supporting structure, means for operating the same to accumulate a load of the material to be handled, and means associated with the ground engaging member and operable to react against a fixed element of the supporting structure to effect rotation of the supporting structure about the ground engaging means.

In testimony whereof I affix my signature.

AUGUST G. LIEBMANN. [L. S.]